(12) United States Patent
Harrison et al.

(10) Patent No.: US 7,168,549 B1
(45) Date of Patent: Jan. 30, 2007

(54) PROGRAMMABLE MODULAR PNEUMATIC LIFT

(75) Inventors: Jason C. Harrison, Marysville, OH (US); David Dillard, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 200 days.

(21) Appl. No.: 11/032,782

(22) Filed: Jan. 11, 2005

(51) Int. Cl.
*B65G 43/08* (2006.01)

(52) U.S. Cl. .................................. 198/346.3; 198/346.2

(58) Field of Classification Search ........... 198/341.01, 198/341.03, 341.04, 341.07, 346.1, 346.2, 198/346.3

See application file for complete search history.

(56) References Cited

U.S. PATENT DOCUMENTS

| | | | | |
|---|---|---|---|---|
| 2,732,962 A | * | 1/1956 | Bullard, III | 198/346.3 |
| 3,425,533 A | * | 2/1969 | Erhardt et al. | 198/346.3 |
| 4,305,495 A | * | 12/1981 | Zinke et al. | 198/346.3 |
| 4,738,387 A | | 4/1988 | Jaufmann et al. | |
| 4,788,786 A | * | 12/1988 | Suter | 198/346.3 |
| 4,884,510 A | | 12/1989 | Vaida et al. | |
| 4,894,909 A | | 1/1990 | Sakamoto et al. | |
| 4,939,838 A | | 7/1990 | Gatta | |
| 4,976,484 A | | 12/1990 | Nomaru et al. | |
| 5,272,805 A | | 12/1993 | Akeel et al. | |
| 5,511,502 A | * | 4/1996 | Moser et al. | 198/346.2 |
| 5,528,818 A | | 6/1996 | Warneke | |
| 5,587,900 A | | 12/1996 | Bullen | |
| 5,715,585 A | | 2/1998 | Zachau et al. | |
| 6,109,424 A | | 8/2000 | Doan | |
| 6,253,878 B1 | | 7/2001 | Wells | |
| 6,386,354 B1 | | 5/2002 | Crorey | |
| 6,619,466 B1 | | 9/2003 | Jack et al. | |
| 6,708,393 B1 | | 3/2004 | Roy et al. | |
| 2003/0150657 A1 | | 8/2003 | Shupp et al. | |

FOREIGN PATENT DOCUMENTS

DE 42 21 366 A1 1/1994

* cited by examiner

*Primary Examiner*—James R. Bidwell
(74) *Attorney, Agent, or Firm*—Rankin, Hill, Porter & Clark LLP; Vincent Ciamacco

(57) ABSTRACT

A conveyor system incorporating a plurality of lift assemblies, wherein the lift assembly includes a platform for supporting an article during manufacture. A cylinder assembly is used for vertically supporting the platform and for moving the platform vertically between any one of a plurality of vertical height positions. A control system is used for actuating the cylinder assembly. The control system monitors the movement of the article along the assembly line, and includes predetermined height/position routines that are used to actuate the cylinder assembly and thereby move the platform vertically to a predetermined platform height corresponding to the location of the article on the line. In this way, the platform heights are selected to provide an ergonomic benefit in performing each operation.

16 Claims, 12 Drawing Sheets

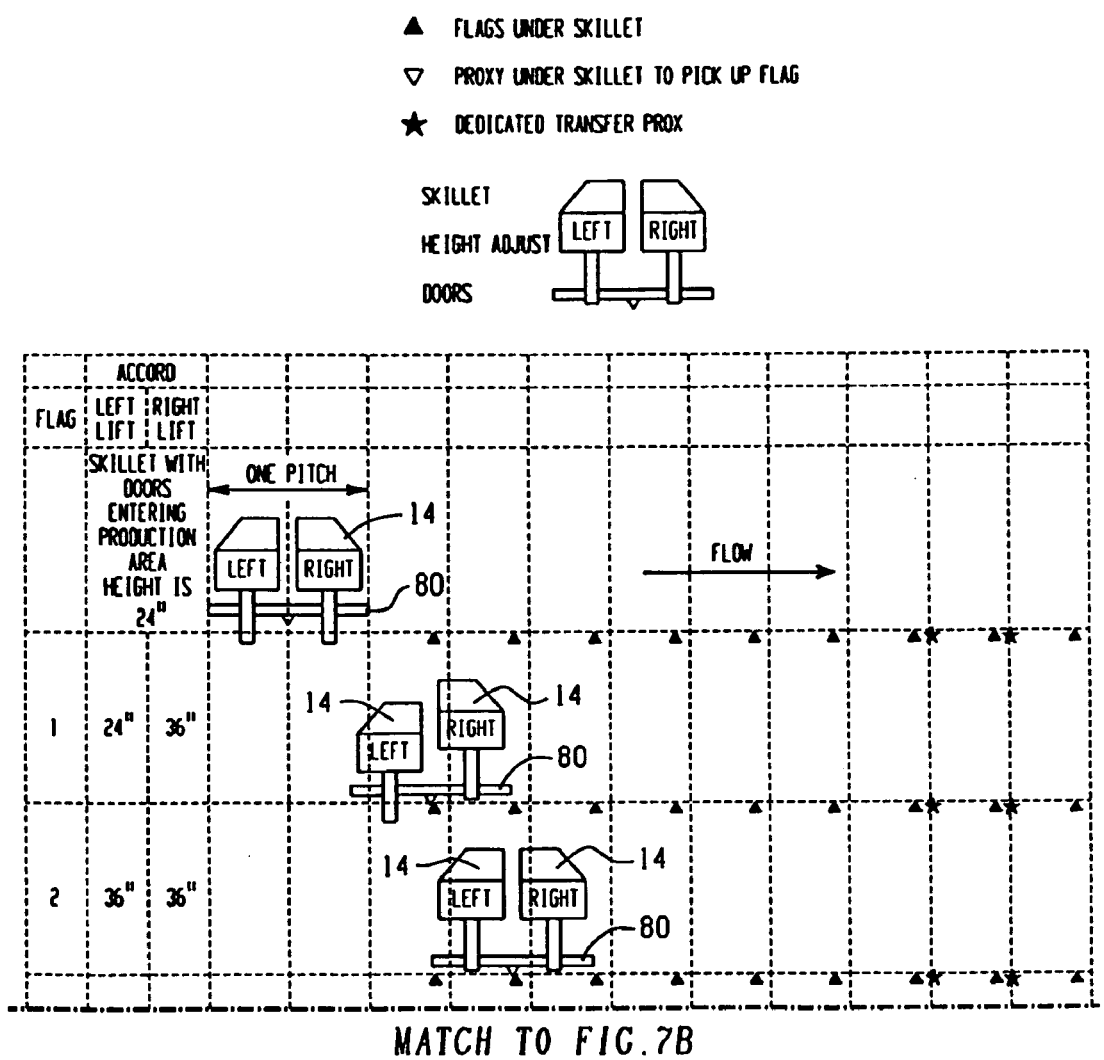

PROGRAMMABLE MODULAR PNEUMATIC LIFT

BACKGROUND OF THE INVENTION

1. Field of the Invention

The present embodiments are directed to the field of manufacturing line conveyors. The present embodiments have particular applicability to the field of automated manufacturing line conveyors that suitably position an article of manufacture for an operation by a manufacturing associate.

2. Description of Related Art

In a conventional manufacturing assembly line process, an article of manufacture is transported down a conveyor line having a number of workstations where various operations are performed by associates. Typically, the article is maintained at a stationary height with respect to the assembly line floor, and an associate performs the specific operation for that workstation.

However, sometimes the article is large or may required operations to be performed on the top and bottom of the article. In these situations, the associate must work in awkward positions, e.g. reaching or bending over or stretching to one side.

Various attempts have been made to address these problems. For example, it has been previously contemplated to place specially designed platforms at each workstation, to enable each associate to step up to a height suitable for the operation at that workstation. However, this requires a significant amount of customization for each workstation, which would have a negative impact on efficiency.

Such special platforms may alleviate problems during the manufacturing operation, but they also create a problem for part retrieval. Parts to be added to an article are typically kept on standard-type shelves along the manufacturing line. While standing on a platform, an associate would be higher than the parts shelf, requiring the associate to bend or stretch to retrieve a part. In this way, such special platforms solve one problem but create another.

To overcome this problem, it has been contemplated to use a number of different conveyor systems for the manufacturing line, where each conveyor system retains the article at a different height, so that operations of a comparable height can be performed on the same line. However, having multiple conveyors reduces efficiency, since each system must be separately installed and maintained. Further, the articles of manufacture must be changed out from each conveyor onto the next, requiring additional time and considerable handling of the article. This further reduces the efficiency of the manufacturing line.

It has previously been known to have a conveyor system capable of raising and lowering an article to fixed heights at fixed positions along a manufacturing line. For example, it was known to run a support platform down a track with vertical curves, so as to raise and lower the height of the platform. Also, it was known to use cam structures and complex gearbox arrangements in order to effect vertical displacement variations. Further, it was known to use a "scissors lift" device on a conveyor line for raising and lowering. However, the devices obtained height variations by inflexible hardware configurations. Such configurations were complex and costly and required major modifications to change. As such, these types of conveyors could only accommodate one type of product and lacked the flexibility to be used in a manufacturing environment where a number of different product model types are created on the same manufacturing line. Also, these previous-type devices had a large physical footprint, making it difficult for associates on a manufacturing line to work on all sides.

SUMMARY OF THE INVENTION

The difficulties and drawbacks associated with previous-type systems are overcome in the present lift assembly, used with an article during manufacture. The lift assembly includes a platform for supporting the article during the manufacturing process. A cylinder assembly is used for vertically supporting the platform and for moving the platform vertically between any one of a plurality of vertical height positions. A control system is used for actuating the cylinder assembly. The control system includes one or more predetermined height/position routines so as to move said platform vertically between a plurality of predetermined platform heights.

The present lift assembly is preferably used with a system for transporting an article during manufacture. The system for transporting includes a conveyor line for providing movement between a plurality of workstations in a manufacturing line. The conveyor line includes a plurality of skillets, wherein each skillet includes at least one lift assembly. The control system includes at least one predetermined height/position routine so as to move the platform vertically between a plurality of predetermined platform heights corresponding to work desired positions at the workstations based upon the position of the host skillet along the conveyor line. In this way, the platform heights can be automatically adjusted between workstations so as to place the article at a desired height, and thereby to provide an ergonomic benefit in performing each assembly or manufacturing operation.

As will be realized, the invention is capable of other and different embodiments and its several details are capable of modifications in various respects, all without departing from the invention. Accordingly, the drawings and description are to be regarded as illustrative and not restrictive.

BRIEF DESCRIPTION OF THE DRAWINGS

FIGS. 7A and 7B are graphical flow charts depicting a portion of a process in accordance with the present embodiments.

DETAILED DESCRIPTION OF THE INVENTION

Figure 1A:
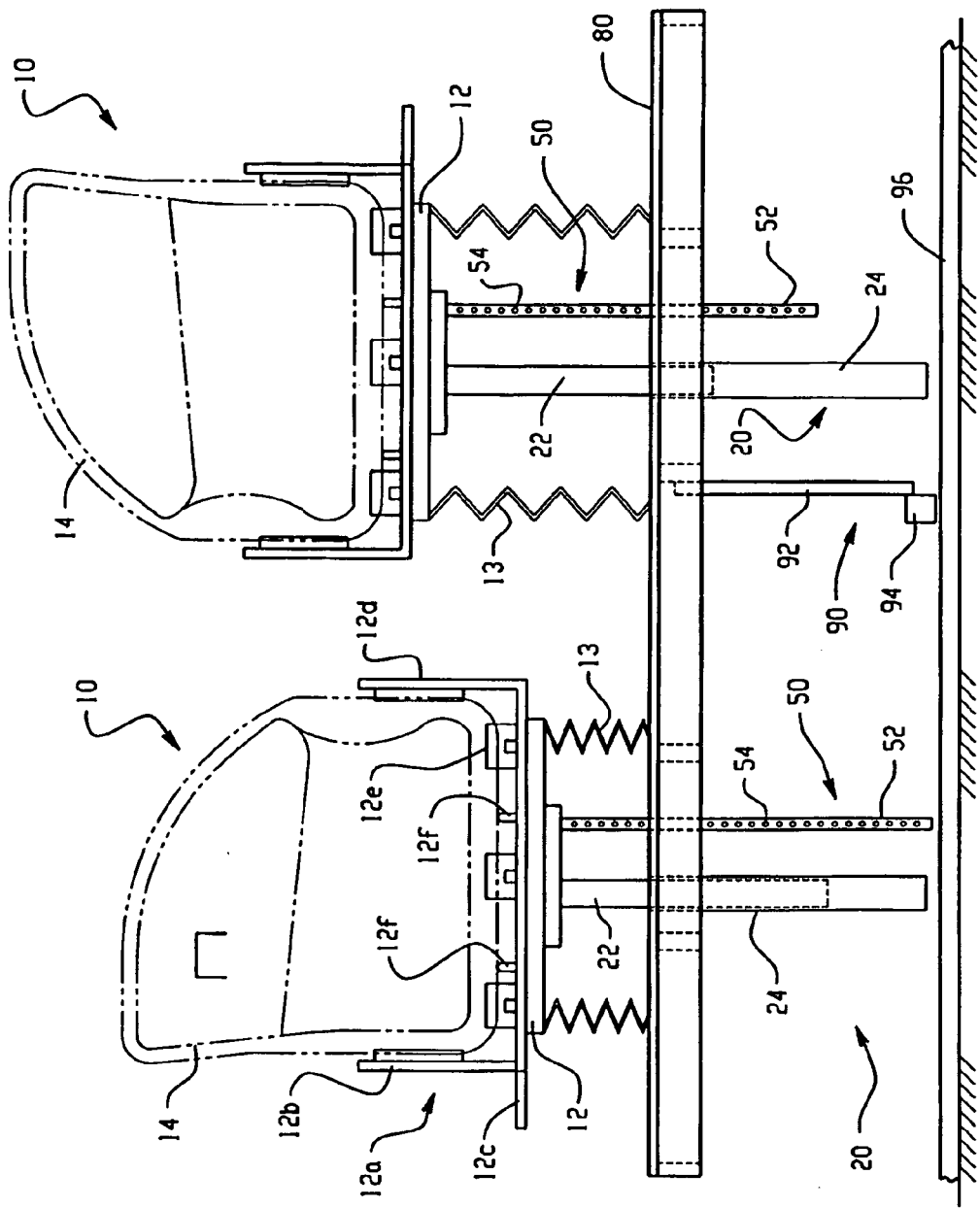
FIGS. 1A and 1B are side-sectional views respectively showing a skillet including a pair of lift assemblies, and a sectional view illustrating the lift assembly, in accordance with the present embodiments.

Particular reference is now made to the drawing figures, where it is appreciated that like reference numerals correspond to like elements. The figures show a lift assembly 10 that includes a cylinder assembly 20 for creating a vertical displacement. A control system is used to actuate the cylinder assembly 20 in accordance with an electronic operating program. The lift assembly 10 also includes a subassembly 50 that facilitates measurement and communication of vertical displacement of the lift assembly 10 to the control system.

As will be described more fully hereinafter, the lift assembly 10 is affixed to a skillet 80 that is itself a part of a conveyor system 70. In the preferred embodiment, as described herein, the present lift system is used with a skillet conveyor, but it is appreciated that the present lift system can also be used with other types of conveyor systems, such as P&F (power and free), trolley, slat, crescent, EMS (electrified monorail systems) and any other type of conveyor, all without departing from the invention.

Figure 1B:
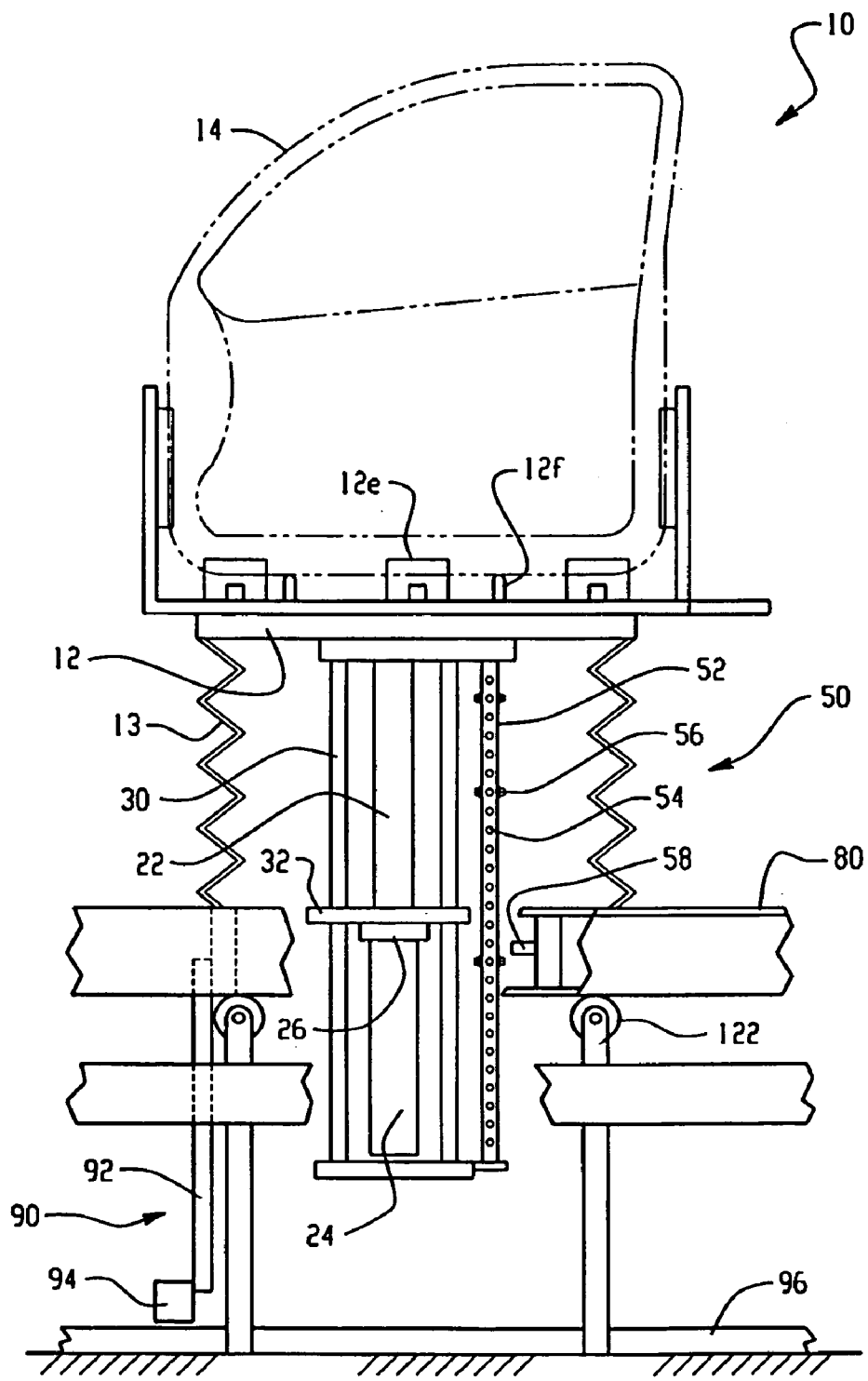

As particularly shown in FIGS. 1A and 1B, the lift assembly 10 includes a platform 12 for supporting an article 14 during a manufacturing process. The platform 12 supports a pallet 12a, which in turn supports the article 14. The pallet 12a includes a slidable L-shaped arm 12b that is slidably secured to a track formed in a base 12c of the pallet 12a. The slidable arm 12b cooperates with a stationary L-shaped arm 12d to receive the article therebetween.

A lower edge of the article 14 is received by pads 12e, which may be formed of 85A durometer urethane or other suitable material, for contacting the article 14 without causing damage. The pads 12e, which are disposed at spaced apart locations so as to provide a stable base for the article, are affixed to the pallet base 12c.

The slidable arm 12b is preferably movable between an engaged position, wherein the article 14 is clamped or held between the arms 12b, 12d, and a disengaged position, which permits access to the ends of the held article and removal of the article 14 from the pallet 12a. The slidable arm 12b thereby allows a number of different-sized articles 14 to be used with the present lift assembly 10. Naturally, the slidable arm 12b may be releasably secured, such as by pinning or clamping, to the base 12c to hold the slidable arm 12b in position and thereby secure the article 14 to the pallet 12a.

Preferably, the pallet 12a is removably supported on the platform 12 so as to allow the article 14 and pallet 12a to be moved on and off the lift 10 as a unit. For example, the illustrated and preferred platform 12 includes a pair of upwardly extending pins 12f that slidably extend through mounting holes formed in the pallet base 12c, so as to position the pallet 12a on the platform 12. One or more upstanding rail member(s) (not shown) on the pallet 12 laterally abut a vertical surface(s) of the platform base 12c, and thereby limits rocking of the pallet 12a relative to the platform 12. Accordingly, the pallet 12a and article 14 may be simply lowered onto, and lifted off of, the platform 12. Naturally, further locking clamps or the like may be used to more positively secure the pallet to the platform, if desired. Alternatively, the pallet 12a may be more permanently affixed to the platform 12, and the article 14 may be removed from the pallet 12a.

In the illustrated embodiment, the article 14 is an automobile door. Of course, it is appreciated that the present system 10 could be adapted for any suitable manufacturing process, without departing from the invention. Preferably, a pleated, flexible skirt 13 extends between the platform 12 and the skillet 80, and encircles or surrounds the otherwise exposed portions of the lift assembly 10. The skirt 13 serves to reduce dirt exposure to the moving portions of the lift assembly 10.

The cylinder assembly 20 is affixed to the associated skillet 80, and serves to support and move the platform 12 vertically between any one of a plurality of vertical height positions. The cylinder assembly 20 preferably includes a pneumatic piston/cylinder assembly. Of course, it is appreciated that the present cylinder assembly 20 could also be a hydraulic system, or any other suitable system for displacing the platform 12.

As indicated in FIG. 1A, the cylinder assembly 20 includes a piston shaft 22 that is received within a cylinder 24, preferably a capped Schedule 40 pipe, or other suitable-type cylinder 24. An upper end of the cylinder 24, which is affixed to the skillet 80 via a supporting collar 32, described hereinafter, is preferably capped with a bushing and seal arrangement 26, so as to maintain an air-tight seal between the cylinder 24 and the piston 22.

FIG. 1A depicts a first embodiment where the platform 12 is supported only by the piston shaft 22. An alternate embodiment is indicated in FIGS. 1B, 3A, 4A and 4B, where the cylinder assembly 20 includes one or more linear guides 30 that move vertically with the platform 12 and assist in guiding the platform 12 as it is raised and lowered by the piston shaft 22. It is noted that the cylinder assembly 20 is disposed directly underneath the platform 12 and article 14, and thereby provides a very small footprint, which is desirable for free access to the article 14.

Preferably, the cylinder 24 incorporates a mechanical lock that holds the shaft 22 in position when air pressure to the cylinder 24 is lost. One guided cylinder incorporating a spring brake that has been used successfully by applicant is sold as part no. MGGLF100-700-XC83, sold by SMC Corporation of America of Indianapolis, Ind. Naturally, other cylinder assemblies may be used interchangeably in the present invention.

The piston shaft 22 and linear guides 30 are slidably received in the supporting collar 32, which is a plate-like structure, affixed to the top of the cylinder 24 and to the skillet 80. As the piston shaft 22 is extended and retracted, the linear guides 30 are slidably displaced with the piston shaft 22 through the supporting collar 32. In this way, the linear guides 30 assist in supporting and distributing the load of the platform 12 as the platform and article 14 are raised and lowered. As noted previously, the present pneumatic lift assembly 10 has a small physical footprint, and thereby allows improved access to all sides of the article 14 during manufacture. Further, the lift assembly 10 is modular, and may be removed by disconnecting four bolts and two air lines from the skillet 80. This allows quick change-outs of the lift assembly 10 in the event that a problem occurs with the lift assembly 10.

Figure 2:
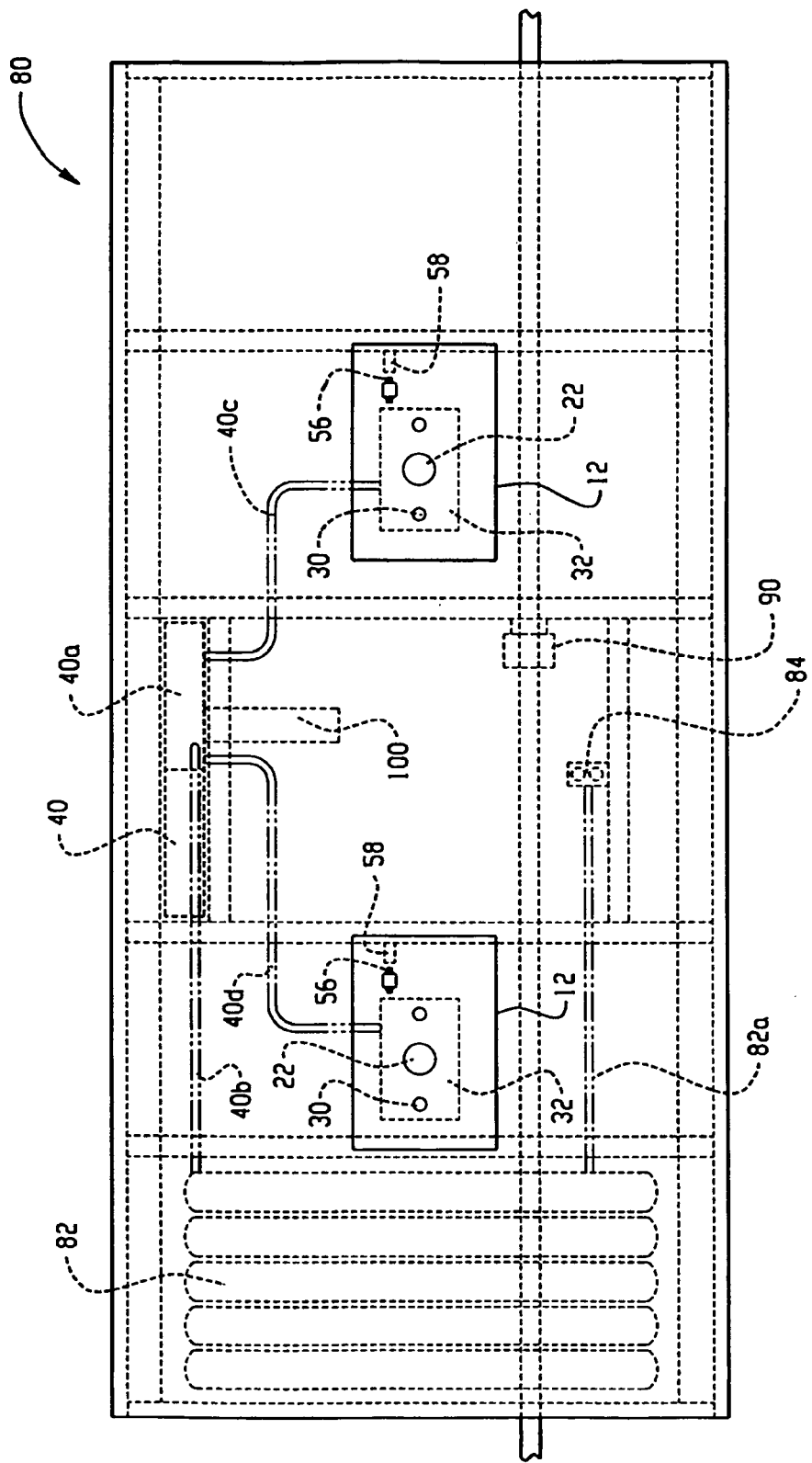
FIG. 2 is a top view showing the construction and configuration of the skillet including the lift assemblies, in accordance with the present embodiments.

As shown in FIG. 2, a control system is provided for actuating the cylinder assembly 20. More specifically, the control system, which preferably is an electronic computer processing system, includes a programmable logic controller (PLC) 40 and an electronically-operated valve assembly 40a. As will be apparent from the following discussion, the PLC 40 includes a series of predefined height/position routines that correlate position of the skillet 80 along a conveyor line with a desired height of the platform 12. It will also be appreciated that the height of the platform 12 and the height of the article 14 are generally used interchangeably hereinafter. Preferably, the predefined height/position routines are stored in the PLC 40 in a look-up table or the like.

The PLC 40 receives information from an interface 100 having proximity switches configured to read flags positioned along the conveyor line, as described hereinafter. The PLC 40 also receives information on the vertical position or extension of the platform 12 from a sensor 58, described hereinafter. The valve assembly 40a is controlled by the PLC 40 and is operable to regulate flow of pressurized air to and from the cylinder assemblies 20 provided by the lift assemblies 10, so as to regulate or affect the height of the associated platform 12 and the article 14 placed thereon.

Based upon the information received via the interface 100, the PLC 40 instructs the valve assembly 40a to actuate the lift assemblies 10 by supplying pressurized air to, or venting pressurized air from, the cylinder assemblies 20 so as to raise/lower the article 14. With feedback control, the PLC 40 instructs the valve assembly 40a to discontinue supplying pressurized air to, or venting pressurized air from, the cylinder assemblies once, based upon information from the sensor 58, it is determined that the desired height has been achieved.

More specifically, and as noted briefly hereinbefore, the PLC 40 is programmed with height/position routines that, when executed, vertically move the platform 12 in a predetermined sequence, with each height/position routine corresponding to an article to be manufactured and being designed to place the article 14 in an optimum position to perform the assembly operation desired at each workstation. Preferably, the PLC 40 also includes a pressure check routine wherein the electromechanical lock on the piston shaft 22 is maintained (i.e., not released) until system pressure in the valve assembly 40a and/or cylinder 24 is confirmed. In the preferred embodiment, one control system (i.e., PLC 40 and valve assembly 40a) is used to control both lift assemblies 10 disposed on the skillet 80.

Executing a selected one of the height/position routines varies the height of the platform 12 vertically between a plurality of selected platform heights corresponding to work positions at each of the workstations 72 along the conveyor line 74, 76. The platform heights are predetermined based on testing and observation so as to allow the associate easy access to the work site on the article 14 associated with the particular workstation.

The lift assembly 10 further includes the subassembly 50 attached to the platform 12. As will be clear from the following, the subassembly 50 defines a series of extension positions corresponding to the plurality of vertical height positions of the platform 12.

Figure 4A:
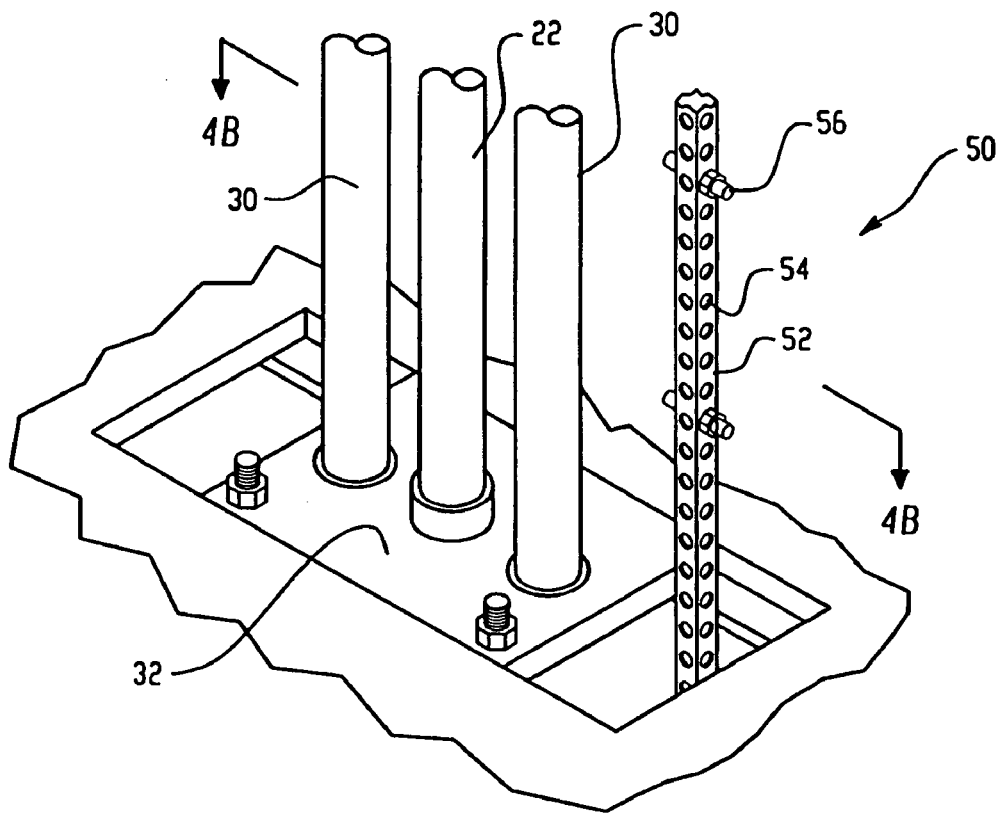
FIGS. 4A and 4B are respective perspective and top views of a portion of the lift assembly subassembly including adjustable flags, in accordance with the present embodiments.
Figure 4B:
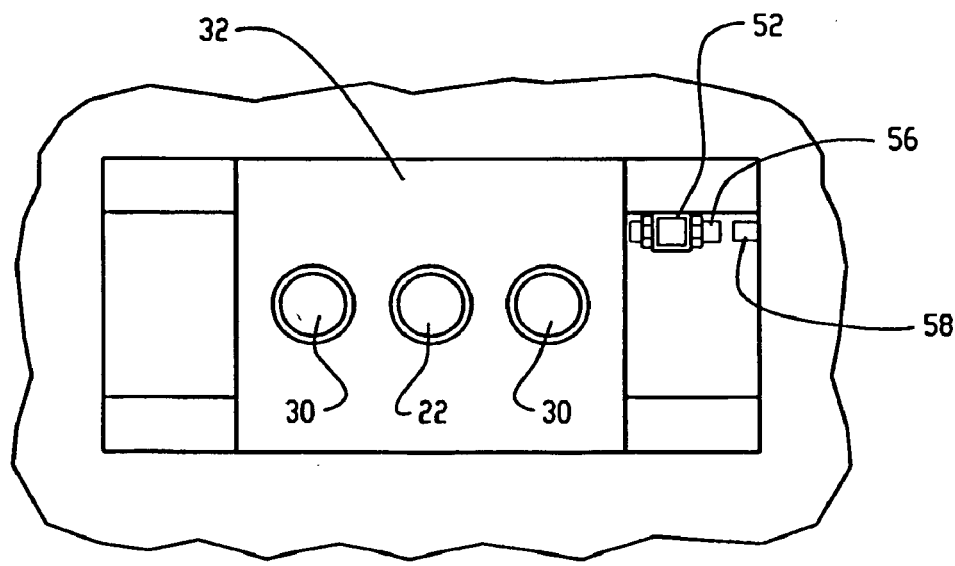

As particularly shown in FIGS. 4A and 4B, the subassembly 50 preferably includes a bar 52 having a plurality of holes 54 formed therein. The subassembly 50 also includes a series of flags 56 that are each secured through a selected hole 54 in the bar 52. A sensor 58 is disposed adjacent the bar and is operable to detect the flags 56 as the bar is moved vertically.

The PLC 40 receives electronic signals from the sensor 58 and counts the flags 56 and also detects a direction of movement of the flags 56, and thereby determines an extension amount of the bar, which corresponds to the vertical position or height of the platform 12.

During installation, the flags 56 are set at fixed positions along the bar 52. For example, six flag positions may be preset, so as to define six respective height positions for the platform 12. For setting a height of an automobile door, the bottom of the platform 12 may be, for example, set at heights of 14, 17, 22, 25, 33 and 36 inches. However, it should be appreciated that the present system can be flexibly set to any height within the range of platform movement.

The PLC 40 can also move the platform 12 by an interpolated amount to set any desired position in between these set flags. In this way, the present system can be programmed to accommodate the individual heights of particular associates working the manufacturing line, so as to provide a specifically tailored ergonomic benefit for each associate. For example, if an associate is known to be taller or shorter, the PLC 40 can adjust the height/position routine so as to move the platform 12 by an additional amount corresponding to the associate's height difference above or below a standard amount. The height of each associate at each station can be entered on an interface, e.g. a touch screen, at the start of a shift. Or the associate heights can be incorporated into an associate record maintained in a computer database with a predetermined schedule for a particular shift, or with a real-time "time card" system that correlates the location of associates at a particular station for a particular shift.

Figure 5A:
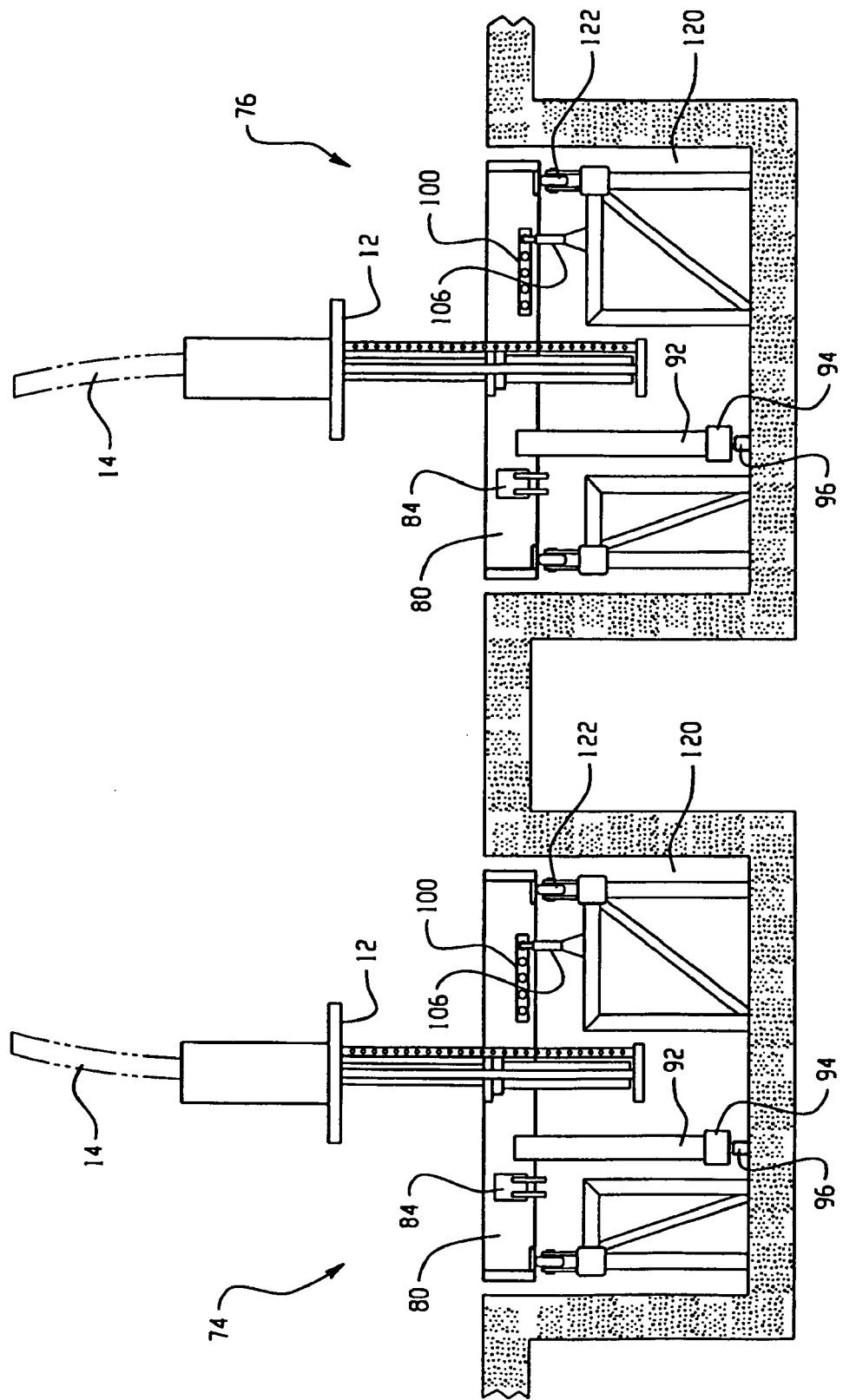
FIG. 5A is a cross-sectional view as seen along line 5A—5A in FIG. 5B.
Figure 5B:
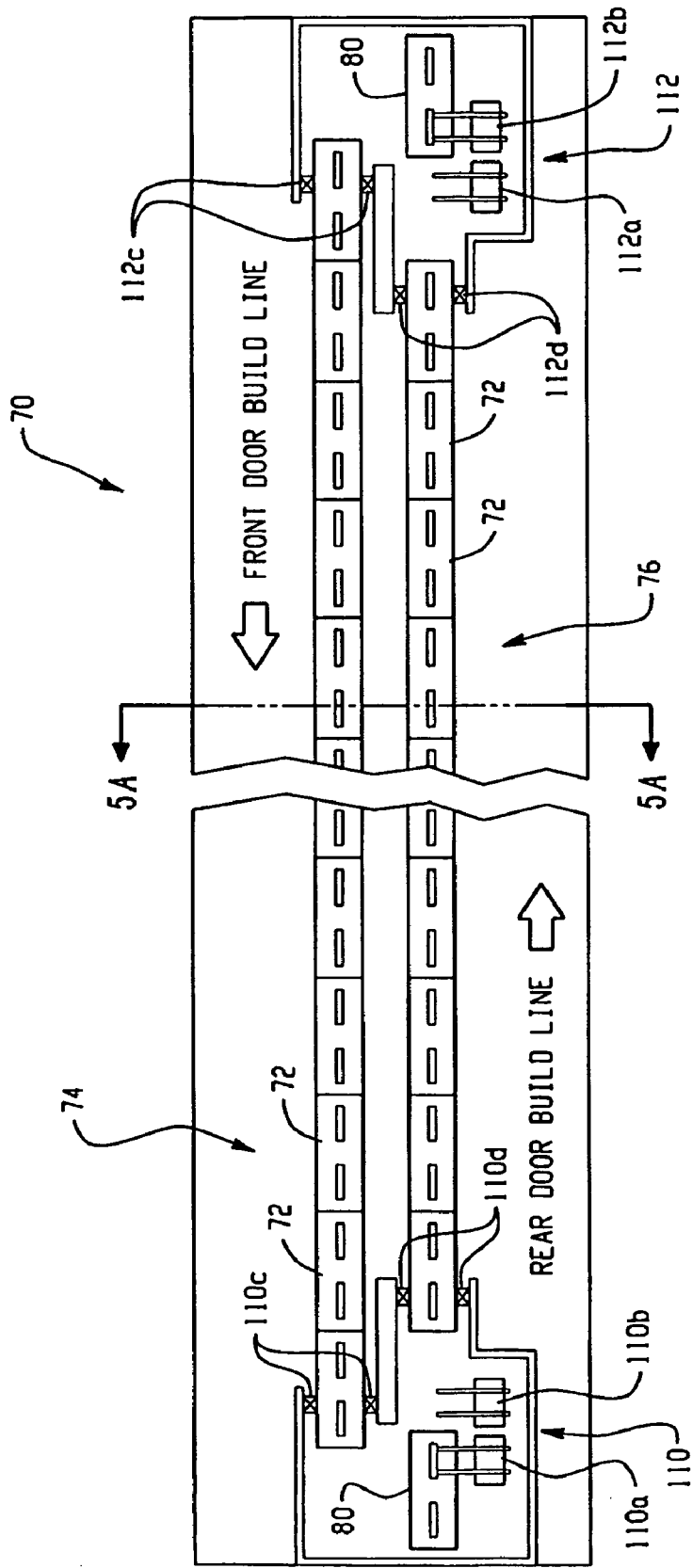
FIG. 5B is a top view, where the figures show a manufacturing line conveyor system in accordance with the present embodiments.

As shown best in FIGS. 5A–5B, the lift assembly 10 is part of the conveyor system 70 for transporting an article 14 between workstations 72 of a conveyor line 74, 76. In the illustrated embodiment of FIG. 5B, first and second conveyor lines 74, 76 are provided, but of course the present system can be adapted to any number of conveyor lines without departing from the invention.

Each conveyor line 74, 76 includes a plurality of skillets 80, with the number of skillets 80 generally matching a number of workstations 72, although this is not required. As noted previously, each skillet 80 preferably has a pair of lift assemblies 10 affixed thereto, and an associated control system. The skillets 80, which in the illustrating embodiments may be thought of as driven rolling platforms, move the articles 14 between the workstations 72 along the conveyor line 74, 76.

It will be appreciated that the pneumatic cylinder assemblies 20 must receive pressurized air from the moving skillet 80, and therefore air hoses or other fluid connections are inconvenient. To overcome this problem, the illustrated skillets 80 include a pressurized fluid tank assembly 82 for providing pressurized fluid to the cylinder assemblies 20. Preferably, the pressurized fluid tank assembly 82 is an air tank assembly including a plurality of air tanks that are mounted underneath the skillet 80, so that pressurized air service can be continuously provided.

In order to maintain pressure in the air tank assembly 82, the skillet 80 includes an air connection port 84 for charging the air tank assembly. In the illustrated embodiment, the air tank assembly 82 is charged during transfer from one conveyor line 74, 76 to the other conveyor line 76, 74. A pressurized air source, e.g. factory air line, a compressor, or the like, includes an automated nozzle (as will be described in detail below) to automatically engage the port 84 when the skillet 80 is in a suitable position. The pressurized air source delivers pressurized air (i.e., at 120–170 psi) to the port 84 and the associated air line 82a (FIG. 2), so as to pressurize the air tank assembly 82. The pressurized tank assembly 82 reduces power requirements for the skillet 80, thereby allowing a simplified electrical power supply, as will be described below.

As noted briefly hereinbefore, pressurized air from the air tank assembly 82 is directed to the valve assembly 40a (e.g., via air line 40b, FIG. 2) and is controllably communicated to either or both of the cylinder assemblies 20 (i.e., via air lines 40c and 40d, respectively, FIG. 2), in response to control signals from the PLC 40. Similarly, the valve assembly 40a selectively vents one or both cylinder assemblies 20 in response to control signals or commands from the PLC 40.

As especially shown in FIGS. 1A, B, 2, 3A, 3B and 5A, the control system receives power from a non-contact power pickup 90. This power pickup 90 includes a shaft 92, which extends downwardly from the skillet 80, for supporting and connecting to a pickup head 94. The pickup head 94 is held in close proximity to a track 96, through which an AC electric current is carried. The pickup head 94 is configured for receiving induction power from the track 96.

In the preferred embodiment, the non-contact power pickup 90 is a 500 Watt pickup, such as part number CPS-PU-04 sold by Vahle Electrification Systems of Houston, Tex. The pickup 90 receives AC power through induction, and rectifies the supplied AC power into DC electrical power to supply energy to the PLC and the sensors. In this way, a wired power connection is not required for the skillet 80. Also, the non-contact pickup 90 does not suffer from wear as would components with physical contact. This scheme also allows continuous power to the PLC 40, valve assembly 40a, and associated sensors, even during transfer of the skillet 80 between the conveyor lines 74, 76, so that the PLC 40 need not be powered up and down.

The present control system includes the sensor interface 100 for sensing which of the plurality of programmed height/position routines is to be used, and for sensing and monitoring the skillet position on the conveyor line 74, 76. The interface 100 includes a plurality of proximity switches for detecting positions of various flags used to implement the present method, as explained hereinbelow.

Figure 3A:
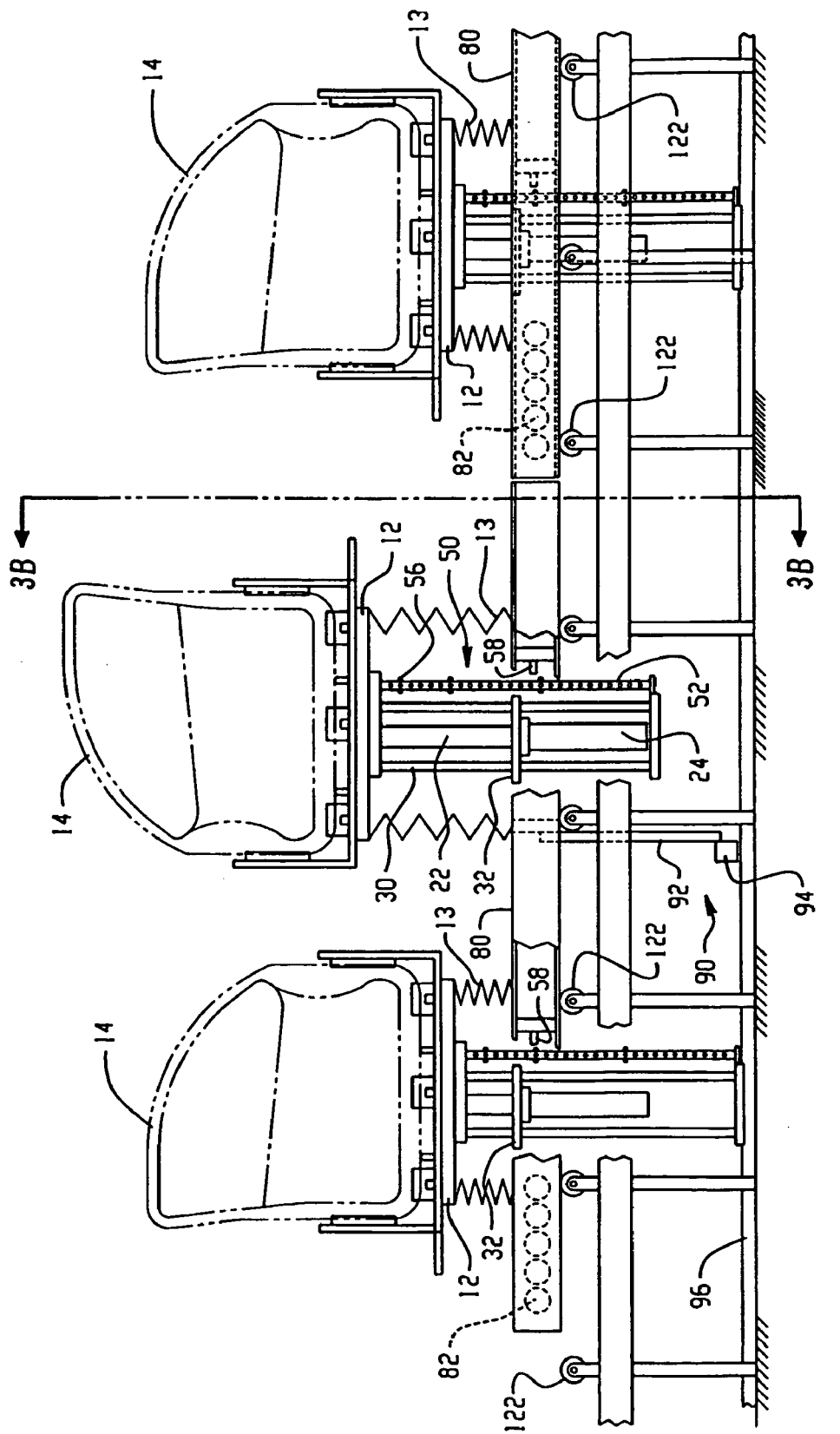
FIGS. 3A and 3B are respectively a side-sectional view and a cross-sectional view as seen along line 3B—3B in FIG. 3A, where the figures show a portion of a conveyor system including skillets and lift assemblies, in accordance with the present embodiments.
Figure 3B:
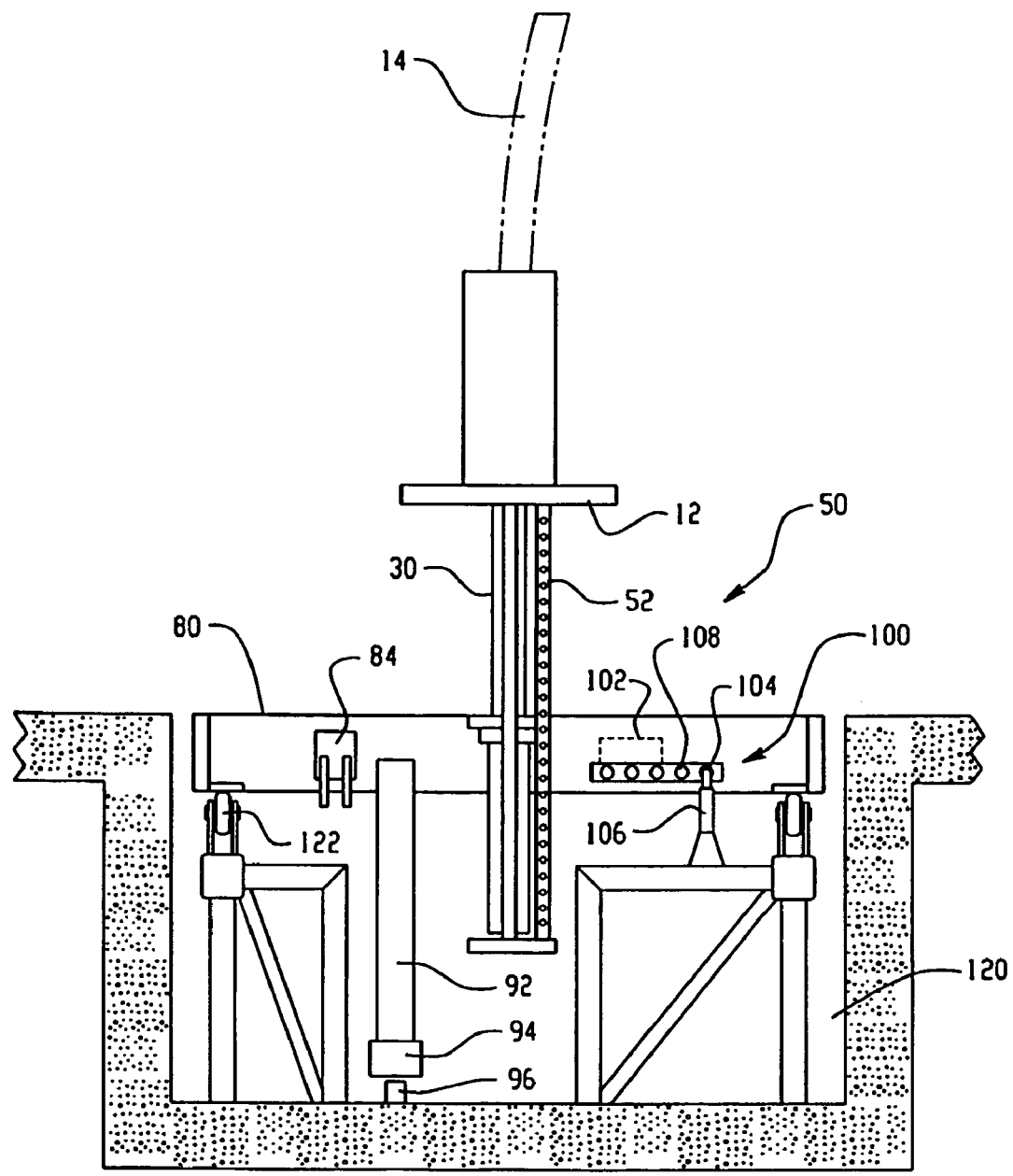

As best indicated in FIG. 3B, the proximity sensors of the interface 100 include three proximity sensors 102 used to detect an arrangement of pre-set flags (not shown) at the beginning or first pitch of the conveyor line 74, 76. It is to be understood that "pitch", as used herein, is a standard spacing interval along the conveyor line 74, 76, i.e. the length of the skillet 80. The pre-set flags (not shown) are configured to correspond to a three-bit binary number associated with a specific product model type which, in turn, identifies the particular height/position routine to be implemented by the PLC 40. Accordingly, the binary number indicated by the pre-set flags is read by the three proximity switches 102 and received by the PLC 40 to determine the height/position routine to be used in controlling or actuating the lift assemblies 10 as the skillet 80 moves along the conveyor line 74, 76.

The interface 100 includes a fourth proximity sensor 104 for detecting a flag 106 at each pitch, which generally corresponds to each workstation 72 along the conveyor line 74, 76. Alternatively, more than one flag 106 per pitch may be used to provide enhanced control over the lift assemblies 10, as described hereinafter. The PLC 40 maintains a count of flag inputs received from the fourth sensor 104, so as to track the skillet position along the conveyor line 74, 76.

As will be appreciated, the PLC 40 uses the information from the fourth sensor 104 (i.e., skillet position information) to implement the height/position routine, which is derived from the first three sensors (102). More specifically, the PLC 40 commands the valve assembly 40a to supply pressurized air to, or vent pressurized air from, either or both of the air cylinder assemblies 20 so that the extension amount of the associated platform 12 matches the height/position routines, as will be discussed below.

The interface 100 also includes a fifth proximity sensor 108 for detecting a flag (not shown) at the end of the conveyor lines 74, 76. When the fifth flag is detected, the PLC 40 actuates the cylinder assembly 20, via the valve assembly 40a, to move the lift assemblies 10 to a predetermined height suitable for transferring the skillet 80 to the next conveyor line 74, 76 and for removing/adding articles 14 from the lift assemblies 10, as will be explained below. The fifth proximity sensor 108 also functions as a redundant or back-up system that assures detection of the end of the conveyor line 74, 76 even if the PLC "loses count" of the workstations 72.

As shown in FIG. 5B, the first and second conveyor lines 74, 76 are parallel to each other, and operate in opposite directions, so as to perform a different set of operations for different articles 14. Skillets 80 are transferred between the conveyor lines 74, 76 at first and second workstations 110, 112, which are at the ends of each line.

The first workstation 110 includes a system (not shown) for transferring the skillet 80 from the end of the first conveyor line 74 to the beginning of the second conveyor line 76. A first assembly 110a is provided for removing pallets 12a retaining completed articles 14 from each lift 10 on the skillet 80. A second assembly 110b is provided for placing pallets 12a retaining new, unfinished articles 14 onto each lift of the skillet 80 in place of the removed articles 14.

A similar transferring system and first and second assemblies 112a, 112b are included at the second workstation 112. The first assembly 112a at the end of the second conveyor line 76 removes the pallets 12a holding built or finished articles 14, first from the lift assembly 10 at the front of the skillet 80, then from the lift assembly 10 at the back of the skillet 80. The second assembly 112b adds pallets 12a holding new or unbuilt unfinished articles 14 to each lift assembly 10, after which the skillet 80 is transferred to the beginning of the first conveyor line 74.

The pallets 12a are lifted on and off the platform 12 by the assemblies 110a, 110b, 112a, 112b, each or which preferably includes a pair of forks that are adapted to extend into fork pockets (not shown) formed in the pallet 12, so as to allow the pallet 12a with the article 14 to be securely lifted on and off the lift assembly 10 on the skillet 80. The first and second workstations 110, 112 preferably include drive assemblies 110c, 110d; 112c, 112d to propel the skillets 80 along the conveyor lines 74, 76 and further drive assemblies (not shown) to transfer or move the skillets 80 between the conveyor lines 74, 76, as will be apparent to those skilled in the art.

In operation, the drive assemblies 110c, 112d grip the skillet 80 at the end of the line and accelerate it into a spaced position ahead of the other skillets on the line. This suitably positions the skillet 80 in the associated first and second assemblies 110a, 110b; 112a, 112b, and allows additional time for procedures such as transferring articles and air charging, as explained in detail hereinbelow.

As indicated above, the air tank assembly 82 is re-charged during transfer from one conveyor line 72, 74 to the other conveyor line 74, 72. As best seen in FIGS. 2, 3B and 5A, the skillet 80 includes an air connection port 84. The air connection port 84 communicates with the air tank assembly 82 via an air line 82a.

When the skillet 80 reaches the end of the conveyor line 74, 76, the skillet is moved away from the other skillets, as described above, and then stopped while the built articles are removed from the associated platform by the first assemblies 110a, 112a, and unbuilt articles are placed on the associated platform by the second assemblies 110b, 112b.

Preferably, the air tank assembly 82 is re-charged with pressurized air, as described hereinafter, while the associated skillet 80 is stopped for unloading and loading of articles, as described above. More specifically, a position-detecting proximity sensor (not shown) is provided to sense when the skillet 80 is in a correct position for unloading/loading and charging. When this position is detected, a lock pin (not shown) is engaged with the skillet 80 to retain the skillet 80 in position. Further, a lock-detecting proximity sensor (not shown) senses whether the lock pin is positively engaged with the skillet 80. Preferably, air from the source cannot flow unless positive engagement between the lock pin and skillet 80 is detected.

Figure 8A:
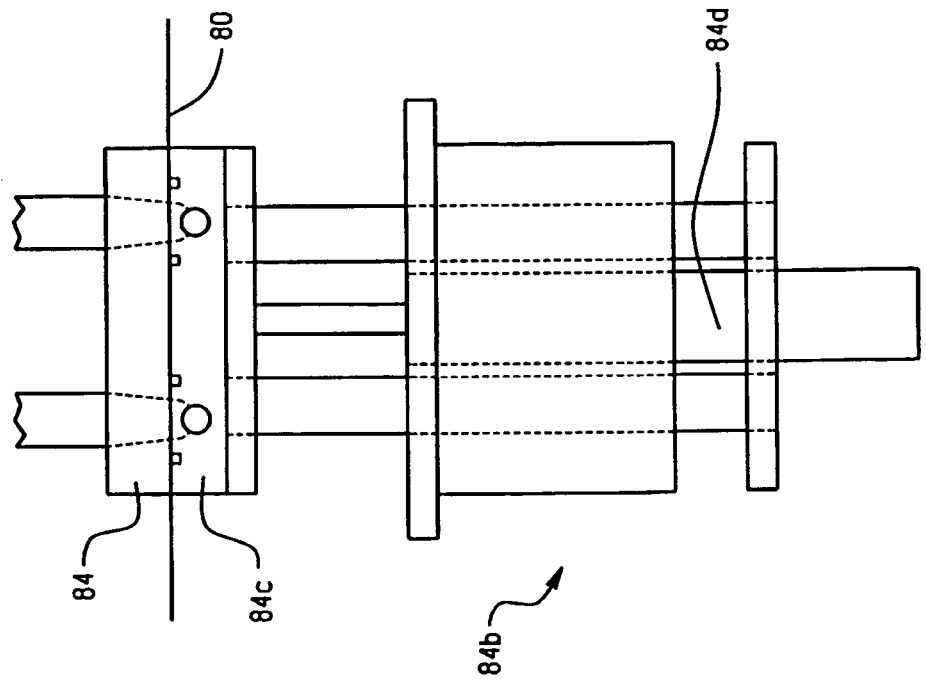
FIGS. 8A and 8B schematically illustrate interaction between an air charging nozzle and an air port in accordance with a preferred embodiment.
Figure 8B:
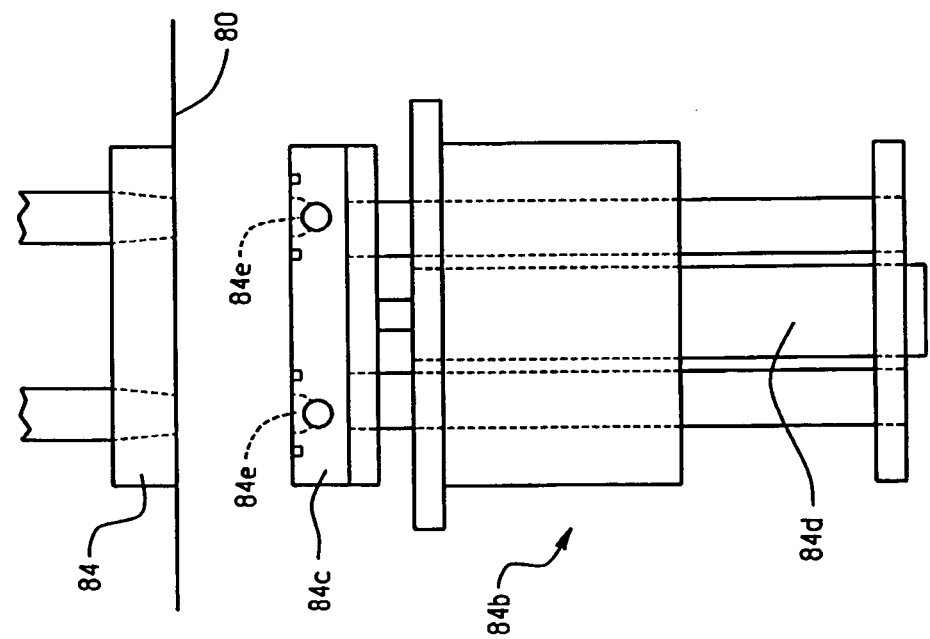

As shown in FIGS. 8A–8B, an automated charging assembly 84b, which is mounted in a trench 120 (as will be discussed in detail below), includes a charging nozzle 84c that is mounted to a guided cylinder 84d. The air connection port 84 or the air line 82a upstream of the air connection port includes one or more check valves (not shown) to permit pressurized air to flow toward the air tank assembly 82 while preventing pressurized air from escaping from the air tank assembly 82 via the air connection port 84.

The guided cylinder 84d slidably receives a piston, and the nozzle 84c is secured to the free end of the piston. When the skillet 80 is properly positioned and secured, the cylinder is pneumatically actuated to extend the piston and drive the nozzle 84c into sealing engagement with the port 84 so as to permit transfer of pressurized air to the air tank assembly 82. Naturally, proximity sensors will detect engagement of the nozzle 84c with the port 84 prior to opening of a valve (not shown) to permit pressurized air to flow through the nozzle 84c, port 84, check valve (not shown) and air line 82a to the air tank assembly 82.

Re-charging of the air tank assembly 82 occurs at a high rate and high pressure, from 90 psi to about 120–150 psi. Preferably, the pressurized air is stored in an intermediate accumulation tank (not shown), downstream from the source and is delivered from the accumulation tank to the nozzle 84c. Providing an accumulation tank assures that an adequate volume of pressurized air is available to re-charge the air tank assembly 82.

The control systems for the skillets 80 on the first conveyor line 74 may have a different set of height/position routines than those provided on the second conveyor line 76. These routines may be different, so as to allow a different selection of heights for performing different operations at the respective workstations on each conveyor 74, 76.

As shown in FIGS. 3B and 5A, each conveyor line 74, 76 is preferably built over or in a trench 120. The skillets 80 are movably supported on rollers 122 that are disposed in the trench 120, so as to permit clear passage of the parts that extend below the skillet 80, including the cylinder assembly 20, the subassembly 50, and the non-contact pickup 90. The non-contact track 96 resides in the bottom of the trench 120. Also, the flags 106 for indicating skillet position are located in the trench 120 at locations corresponding to each workstation 72.

As noted hereinbefore, the present system is used to automatically adjust the height of the articles 14 as they are sequentially moved between workstations on the conveyor line 74, 76. At the beginning of the manufacturing process, the articles 14 are placed on the platform 12 of the skillet 80. The height/position routine to be utilized is determined by the PLC 40 from the position of the arrangement of pre-set flags, described previously. The skillet 80, and articles 14 disposed thereon, is then moved along the conveyor line 74, 76. The position of the skillet 80 is monitored as the skillet moves along the conveyor line 74, 76, and the vertical position of the article 14 is changed, based upon the monitored skillet position and in accordance with the selected height/position routine.

More specifically, the signals from the fourth sensor 104 (i.e., skillet position signals) and signals from the sensor 58 (i.e., extension position of platform 12) are received by the PLC 40. The PLC 40 compares the current extension position (based upon monitored position) to the desired platform position from the height/position routine, and commands the valve assembly 40a to actuate the cylinder assembly 20 such that the current extension position equals the desired extension position at the current position of the skillet 80 along the conveyor line 74, 76.

Figure 6:
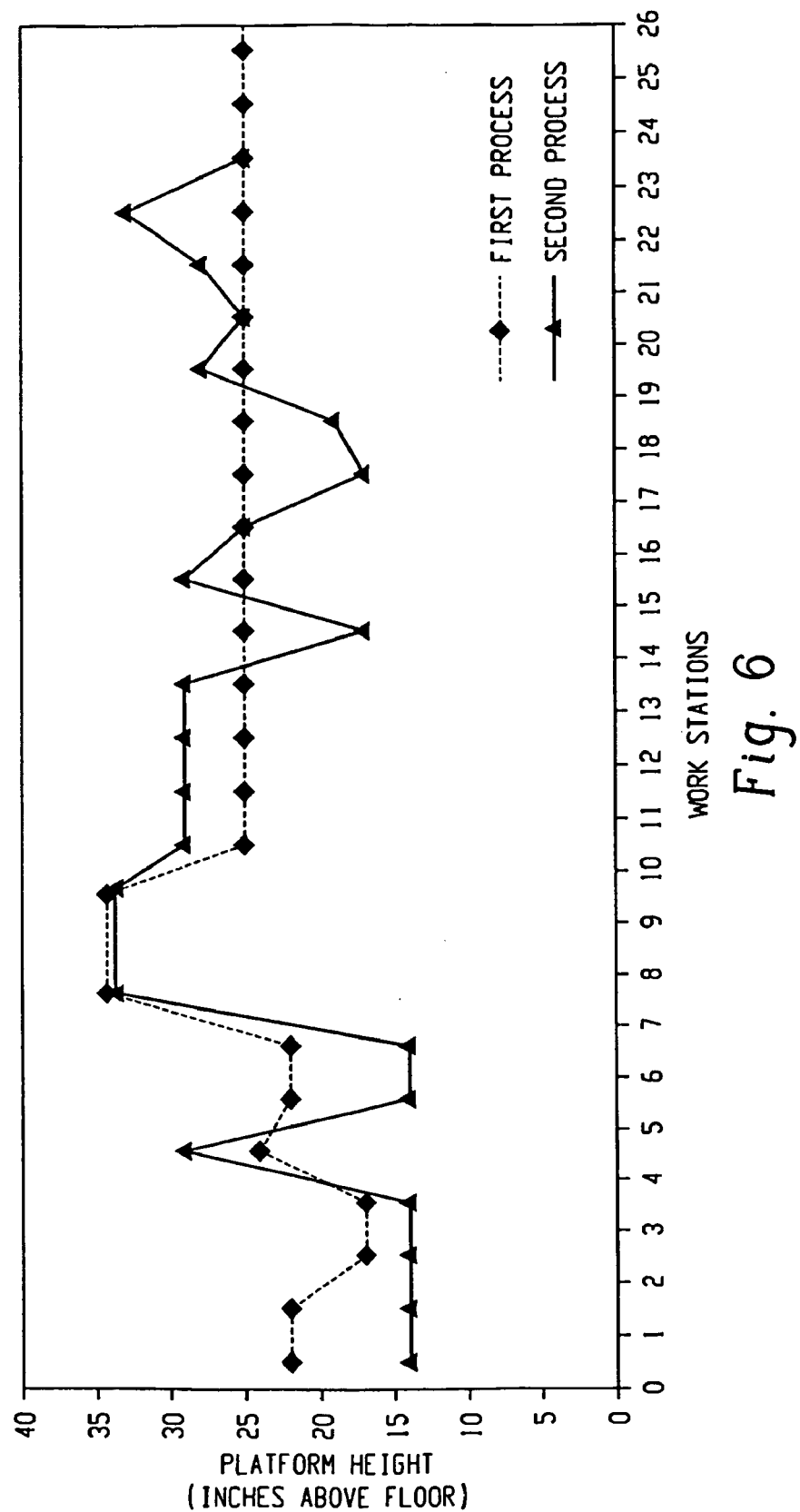
FIG. 6 is a graph comparing exemplary sequences of height positions for a plurality of workstations, and compare heights of a known system with a system according to the present embodiments.

FIG. 6 is a graph comparing the height of the platform at each of the workstations along a conveyor line using an old system and using the present invention. As will be appreciated, the old system relied upon manual interaction to adjust the height, and therefore provided relatively few height adjustments. With the new system, described hereinbefore, many height changes are possible, leading to great ergonomic and production gains.

Figure 7B:
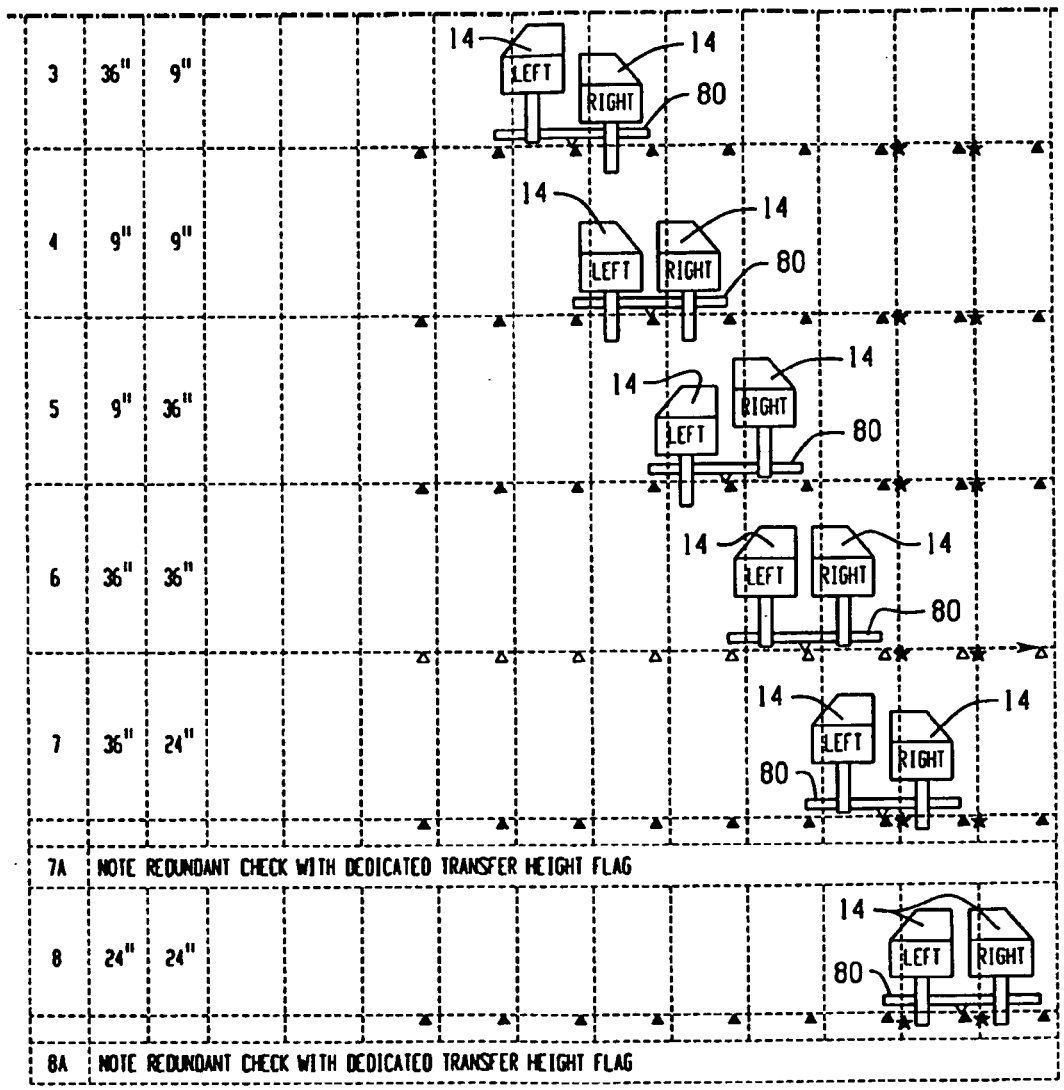

An additional alternative exemplary height/position routine for both doors 14 on the skillet 80 is illustrated in FIGS. 7A and 7B. As the skillet 80 enters the line, the doors 14 are set at a standard platform height of 24 inches. The first three proximity sensors 102 read the initial flags, and the PLC 40 implements the desired height/position routine corresponding to the three flags read by the proximity sensors 102.

At a first workstation, after the skillet 80 has traveled one pitch down the line, the fourth proximity sensor 104 under the skillet 80 (indicated in the figure by a white "delta" shape) encounters the flag 106 (indicated in the figure by a black "triangle" shape). In this particular embodiment as shown, there are two flags 106 for each pitch along the line. Having multiple flags for each pitch permits greater control over the lift assemblies 10. For example, contact with a first flag of the pitch will affect the vertical displacement of the right door 14 (the door leading skillet movement) whereas contact with a second flag of the pitch will affect the vertical displacement of the left door 14 (the trailing door).

In accordance with the selected height/position routine, the right door height is set to 36 inches. Upon encountering the next flag 106 at the second workstation, the left door is set to 36 inches. At each workstation, the height of each door is compared with the height desired by the height/position routine at that position along the conveyor line 74, 76, and the door is accordingly raised, lowered, or maintained such that the door height tracks the desired height of the height/position routine. This process is repeated at each workstation 72 until the fifth proximity sensor 108 (indicated in the figure by a black "star" shape), which serves as a dedicated transfer flag at the end of the conveyor line 74, 76. At this time, the platform heights are set to 24 inches, to position the articles 14 for removal from the skillet 80, for receipt of new articles on the platforms 12, and for transfer of the skillet 80 to the next line 74, 76.

As described hereinabove, the present invention solves many problems associated with previous type devices. However, it will be appreciated that various changes in the details, materials and arrangements of parts which have been herein described and illustrated in order to explain the nature of the invention may be made by those skilled in the art within the principle and scope of the invention will be expressed in the appended claims.

What is claimed is:

1. A lift assembly that is movable along a conveyor line, comprising:
   a platform for supporting an article;
   a cylinder assembly for vertically supporting the platform and for moving said platform and article vertically;
   a control system, said control system being operable to determine a position of said lift assembly along the conveyor line and a height of at least one of said article and said platform, said control system being adapted to actuate said cylinder assembly to raise or lower said platform in accordance with a predetermined height/position routine such that the determined height of said at least one of said article and said platform corresponds with a height of the height/position routine at the determined position, and
   a pressurized fluid tank assembly to supply pressurized fluid to the cylinder assembly.

2. The lift assembly of claim 1, wherein the cylinder assembly comprises a pneumatic piston/cylinder assembly with at least one linear guide.

3. The lift assembly of claim 1, further comprising a subassembly that defines a plurality of extension positions that are correlated to a plurality of height positions of said at least one of said platform and said article, and wherein the control system comprises a programmable logic controller that uses a determined extension position of the subassembly to determine the height of the platform or article.

4. The lift assembly of claim 3, wherein the subassembly comprises a bar having a plurality of flags disposed thereon, wherein the programmable logic controller communicates with a sensor that detects said flags, and wherein the programmable logic controller receives signals from said sensor to monitor movement of the bar and correlate the extension position of said bar to the determined height.

5. The lift assembly of claim 1, wherein the control system comprises a plurality of height/position routines and provides an interface for selecting one of said plurality of routines to be used.

6. A system for transporting an article during manufacture thereof, comprising:
   a conveyor for moving the article between a plurality of workstations, wherein the conveyor supports at least one lift assembly, said lift assembly comprising:
      a cylinder assembly for vertically supporting the article and for moving said article vertically; and,
      a control system that is operable to determine a position of said article relative to the workstations and a height of said article, said control system being adapted to actuate said cylinder assembly to raise or lower said article in accordance with a predetermined height/position routine such that the determined height of said article corresponds with a height of the height/position routine at the determined article position,
   wherein the conveyor includes a plurality of skillets, and wherein each skillet comprises a pressurized fluid tank assembly for providing pressurized fluid to the cylinder assembly disposed thereon.

7. The system according to claim 6, wherein the conveyor includes a skillet, and the cylinder assembly includes a piston that is movably received in a cylinder, said cylinder being affixed to said skillet and said piston having an end affixed to a platform on which the article is held so that extension and retraction of said piston relative to said cylinder vertically moves said platform and article relative to said skillet.

8. The system according to claim 7, further comprising a subassembly that defines a plurality of extension positions that are correlated to a plurality of height positions of said at least one of said platform and said article, and wherein the control system comprises a programmable logic controller that uses a determined extension position of the subassembly to determine the height of the platform or article.

9. The system of claim 6, wherein the cylinder assembly comprises a pneumatic cylinder and wherein the pressurized fluid tank assembly comprises an air tank assembly.

10. The system of claim 9, wherein each of said skillets support an air connection port through which pressurized air is injected for charging the air tank assembly.

11. The system of claim 6, wherein the control system further comprises a non-contact power pickup for receiving induction power from outside the conveyor.

12. The system of claim 6, further comprising a subassembly that defines a plurality of extension positions that are correlated to a plurality of height positions of said article, and wherein the control system comprises a programmable logic controller that uses a determined extension position of the subassembly to determine the height of the article.

13. The system of claim 6, wherein a plurality of height/position routines are stored in the control system and the control system comprises an interface for selecting one of the plurality of programmed height/position routines to be used.

14. A method for adjusting a height of an article as said article is sequentially moved along a conveyor line between a plurality of workstations, comprising the steps of:
   selecting a height/position routine to be used, said height/position routine correlating a desired article height with a position of said article along the conveyor line;
   placing the article on a lift assembly;
   operating said conveyor line to move said article between a pair of workstations;
   determining the position of said article along the conveyor line;
   determining a height of said article;
   actuating said lift assembly to raise or lower said article based upon said determined article position, said determined article height, and the selected height/position routine such that the determined height of said article matches the desired height of the article at the determined article position along the conveyor line.

15. The method of claim 14, wherein the lift assembly comprises a cylinder assembly and a control system, wherein said control system determines the position and the article height, and actuates said cylinder assembly such that the determined article height corresponds to a height of the height/position routine at the determined position.

16. A method for operating a conveyor line so as to accommodate articles from different groups, said conveyor line incorporating a plurality of lift systems, each of said lift systems being associated with a control system and being adapted to hold an article as said article is moved along said conveyor line to a plurality of workstations, wherein a predetermined height/position routine for each group of articles is stored in said control system and is used to actuate said lift systems to vary a height of the articles as said articles are moved along the conveyor line, comprising the steps of:

placing a first article on a first lift system, said first article being a member of a first group of articles;

placing a second article on a second lift system, said second article being a member of a second group of articles;

selecting a first height/position routine from said plurality of height/position routines, said selected first height/position routine corresponding to the first group of articles;

selecting a second height/position routine from said plurality of height/position routines, said selected second height/position routine corresponding to the second group of articles;

operating said conveyor line to simultaneously move said first and second articles between the workstations;

determining a position of said first article along the conveyor line;

determining a height of said first article at the determined position;

actuating said first lift assembly to raise or lower said first article based upon said determined first article position, said determined first article height, and the selected first height/position routine such that the determined height of said first article matches the desired height of the first article at the determined first article position along the conveyor line;

determining the position of said second article along the conveyor line;

determining a height of said second article at the determined position of the second article along the conveyor line;

actuating said second lift assembly to raise or lower said second article based upon said determined second article position, said determined second article height, and the selected second height/position routine such that the determined height of said second article matches the desired height of the second article at the determined second article position along the conveyor line.

* * * * *